United States Patent
Hong et al.

(10) Patent No.: US 8,733,389 B2
(45) Date of Patent: May 27, 2014

(54) MIXED WATER CONTROL VALVE

(75) Inventors: Chu-wan Hong, Taichung (TW);
Ching-chen Shieh, Taichung (TW);
Yuan-hao Chang, Taichung (TW);
Tsung-yi Lo, Taichung (TW)

(73) Assignee: Globe Union Industrial Corp., Taichung (TW)

( * ) Notice: Subject to any disclaimer, the term of this patent is extended or adjusted under 35 U.S.C. 154(b) by 344 days.

(21) Appl. No.: 13/370,175

(22) Filed: Feb. 9, 2012

(65) Prior Publication Data

US 2013/0074961 A1    Mar. 28, 2013

(30) Foreign Application Priority Data

Sep. 22, 2011   (CN) ...................... 2011 2 0358218 U

(51) Int. Cl.
*F15B 13/00*   (2006.01)

(52) U.S. Cl.
USPC . 137/269; 137/597; 137/625.19; 137/625.42; 137/625.47

(58) Field of Classification Search
USPC .................... 137/269, 270, 271, 597, 625.12, 137/625.19, 625.41, 625.42, 625.47, 602, 137/897
See application file for complete search history.

(56) References Cited

U.S. PATENT DOCUMENTS

| | | | | |
|---|---|---|---|---|
| 5,275,195 A | * | 1/1994 | Breda | 137/100 |
| 5,325,887 A | * | 7/1994 | Egli et al. | 137/270 |
| 6,123,094 A | * | 9/2000 | Breda | 137/98 |
| 6,877,523 B2 | * | 4/2005 | Dempsey et al. | 137/98 |
| 2004/0040603 A1 | * | 3/2004 | Shieh | 137/597 |

* cited by examiner

*Primary Examiner* — Craig Schneider
*Assistant Examiner* — Jessica Cahill
(74) *Attorney, Agent, or Firm* — Che-Yang Chen; Law Office of Michael Chen

(57) ABSTRACT

A mixed water control valve having a body and a spindle is disclosed. The body has two inlet pipes and two outlet pipes which are longitudinally corresponding to the two inlet pipes. The two inlet pipes are branched into a upper inlet pipe and a lower inlet pipe which are disposed in different height positions. The spindle is rotatably assembled in the body. The spindle has an upper and a lower inlets corresponding to the height of the upper and the lower inlet pipe and. The spindle also has an upper outlet and a lower outlet respectively corresponding to the two outlet pipe. Thereby, the spindle is detachable and convenient to repair and replace and the spindle is also capable of changing mounting directions to change the flowing directions of water and then to match the different arrangements of the inlet pipes of cold and hot water.

20 Claims, 12 Drawing Sheets

MIXED WATER CONTROL VALVE

FIELD OF THE INVENTION

The present invention generally relates to a feed valve, and more particularly to a mixed water control valve capable of repairing easily and adapting to different arrangements of cold water pipe and hot water pipe.

BACKGROUND OF THE INVENTION

Recently, the faucet for mixing water with different temperatures in the market is using two ceramic valves to control and mix water. The features of the ceramic valve are high hardness and good wear resistance, so the faucet using the ceramic valve generally has long life time.

However, the faucet using the ceramic valve has the problem of dust and rust deposit getting into between the two ceramic valves to make the two ceramic valves be blocked and unable to operate. Once the problem happens, it is not able to be repaired and the faucet is not able to continue using. A new faucet is needed to replace the old one. It is inconvenient for a user.

Therefore, the most important objective of this invention is how to design a faucet with mixed water control valve which is easy repair and use.

Next, for the convenience to arrange the pipes of some buildings, two sides of the partitions are designed to a room for providing water, such as a bathroom. Please refer to FIG. 12, which shows a top and sectional view of a part of a building. There is a piping space 83 between two partitions 81, 82. A hot water pipe 84 and a cold water pipe 85 are longitudinally extending in the piping space 83. Two sides of the partitions 81, 82 are respectively arranged a room for providing water (such as bathroom) 86, 87. The hot water pipe 84 and the cold water pipe 85 are respectively extending hot water branch pipes 841, 842 and cold water branch pipes 851, 852 toward two rooms for providing water 86, 87. These two rooms for providing water 86, 87 are capable of sharing one set of the hot water pipe 84 and the cold water pipe 85.

However, the recent faucets have manufactured in normal standards, that is the left side of the faucet is the inlet pipe of hot water and the right side of the faucet is the inlet pipe of cold water which is adapting to the room for providing water 87 shown as FIG. 12 but not adapting to the room for providing water 86 due to the arrangement of the cold water pipe and the hot water pipe in the room for providing water 86 is opposite to the normal standards (room for providing water 87).

If this, the inlet pipes of cold water and hot water should be re-directed by another pipes or another set of inlet pipes of cold water and hot water is needed to match the faucet. It is not convenient for users.

Therefore, the secondary objective of this invention is how to design a faucet with a mixed water control valve which is adapting to different arrangements of inlet pipes of cold water and hot water.

SUMMARY OF THE INVENTION

An objective of this invention is providing a mixed water control valve, which is using the pipes for mixing water to be disposed at the spindle, and the spindle is detachably disposed in the space of the body to achieve the effectives of repairing and using easily.

An another objective of this invention is providing a mixed water control valve, which is including two outlet pipes corresponding to each other, and the spindle is capable of mounting in different direction if need to achieve to adapt the different arrangements of cold water pipe and hot water pipe.

To achieve above objectives, a mixed water control valve is disclosed and comprises a body, having a first inlet pipe, a second inlet pipe opposite to the first inlet pipe, a first outlet pipe, and a second outlet pipe opposite to the first outlet pipe, the body also having a space, the first inlet pipe is branched to a first upper inlet pipe and a first lower inlet pipe, one end of the first upper inlet pipe away from the first inlet pipe and one end of the first lower inlet pipe away from the first inlet pipe are connected to the space, the second inlet pipe is branched to a second upper inlet pipe and a second lower inlet pipe, one end of the second upper inlet pipe away from the second inlet pipe and one end of the second lower inlet pipe away from the second inlet pipe are connected to the space, the first outlet pipe and the second outlet pipe are connected to the space; and a spindle, axially rotatably disposed in the space, a cavity is formed inside the spindle and a balance valve is disposed in the cavity to divide the cavity into an upper cavity and a lower cavity, the spindle is having an upper inlet corresponding to a height of the first inlet pipe and connecting to the upper cavity, the upper inlet is selectively corresponding to the first upper inlet pipe or the second upper inlet pipe, the spindle is having a lower inlet corresponding to a height of the first lower inlet pipe and connecting to the lower cavity, the lower inlet is selectively corresponding to the first lower inlet pipe or the second lower inlet pipe, the upper inlet and the lower inlet are radially corresponding to each other, the spindle is having an upper outlet and a lower outlet which are respectively corresponding to a height of the first outlet pipe, the upper outlet is connecting to the upper cavity and the lower outlet is connecting to the lower cavity, the upper outlet and the lower outlet are selectively corresponding to the first outlet pipe or the second outlet pipe; wherein the lower inlet is corresponding to the first lower inlet pipe and the upper outlet and the lower outlet are corresponding to the first outlet pipe while the upper inlet is corresponding to the second upper inlet pipe; in contrast, the lower inlet is corresponding to the second lower inlet pipe and the upper outlet and the lower outlet are corresponding to the second outlet pipe while the upper inlet of the spindle is corresponding to the first upper inlet pipe.

The spindle is capable of changing mounting directions. When the upper inlet of the spindle is corresponding to the second upper inlet pipe, the lower inlet is corresponding to the first lower inlet pipe and the upper outlet and the lower outlet are corresponding to the first outlet pipe to make the mixed water control valve is capable of flowing out from the first outlet pipe. In contrast, when the upper inlet of the spindle is corresponding to the first upper inlet pipe, the lower inlet is corresponding to the second lower inlet pipe and the upper outlet and the lower outlet are corresponding to the second outlet pipe to make the mixed water control valve is capable of flowing out from the first outlet pipe. It is capable of adapting to different arrangements of cold water pipe and hot water pipe.

Further features and advantages of the present invention will become apparent to those of skill in the art in view of the detailed description of preferred embodiments which follows, when considered together with the attached drawings and claims.

BRIEF DESCRIPTION OF THE DRAWINGS

All the objects, advantages, and novel features of the invention will become more apparent from the following detailed descriptions when taken in conjunction with the accompanying drawings.

DESCRIPTION OF THE PREFERRED EMBODIMENT

Figure 1:
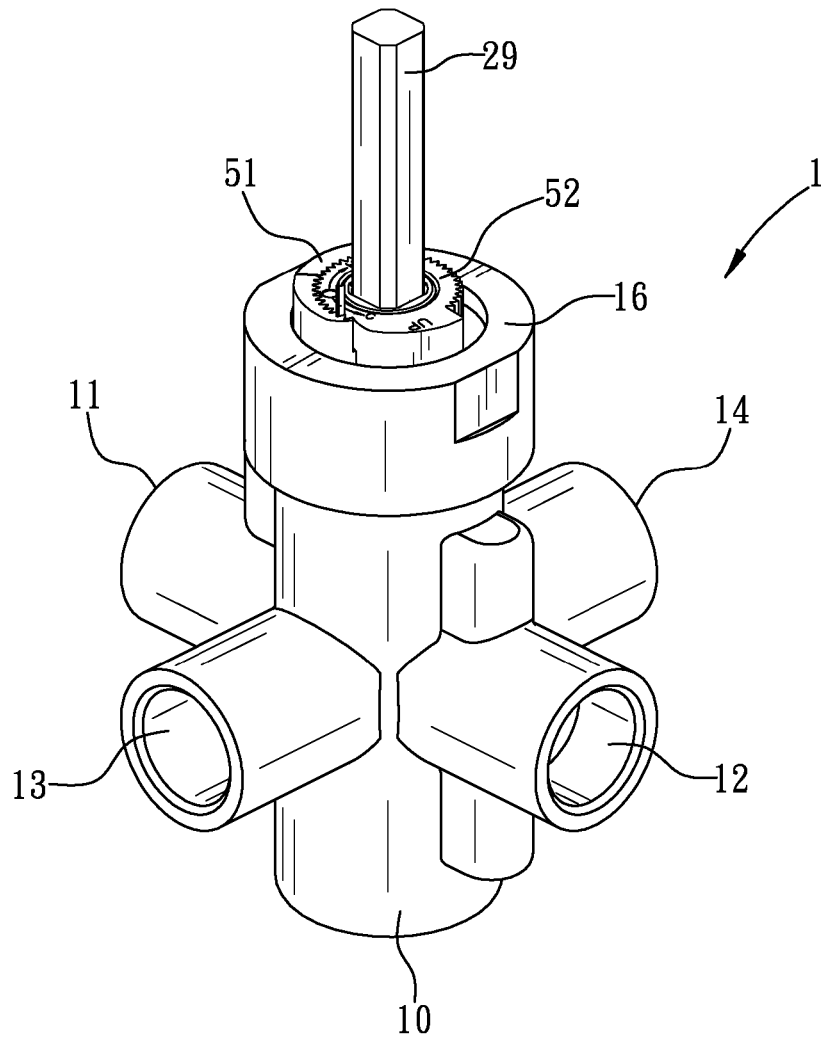
FIG. 1 illustrates a pictorial drawing in accordance with this invention.

Referring now to the drawings where like characteristics and features among the various figures are denoted by like reference characters.

Figure 2:
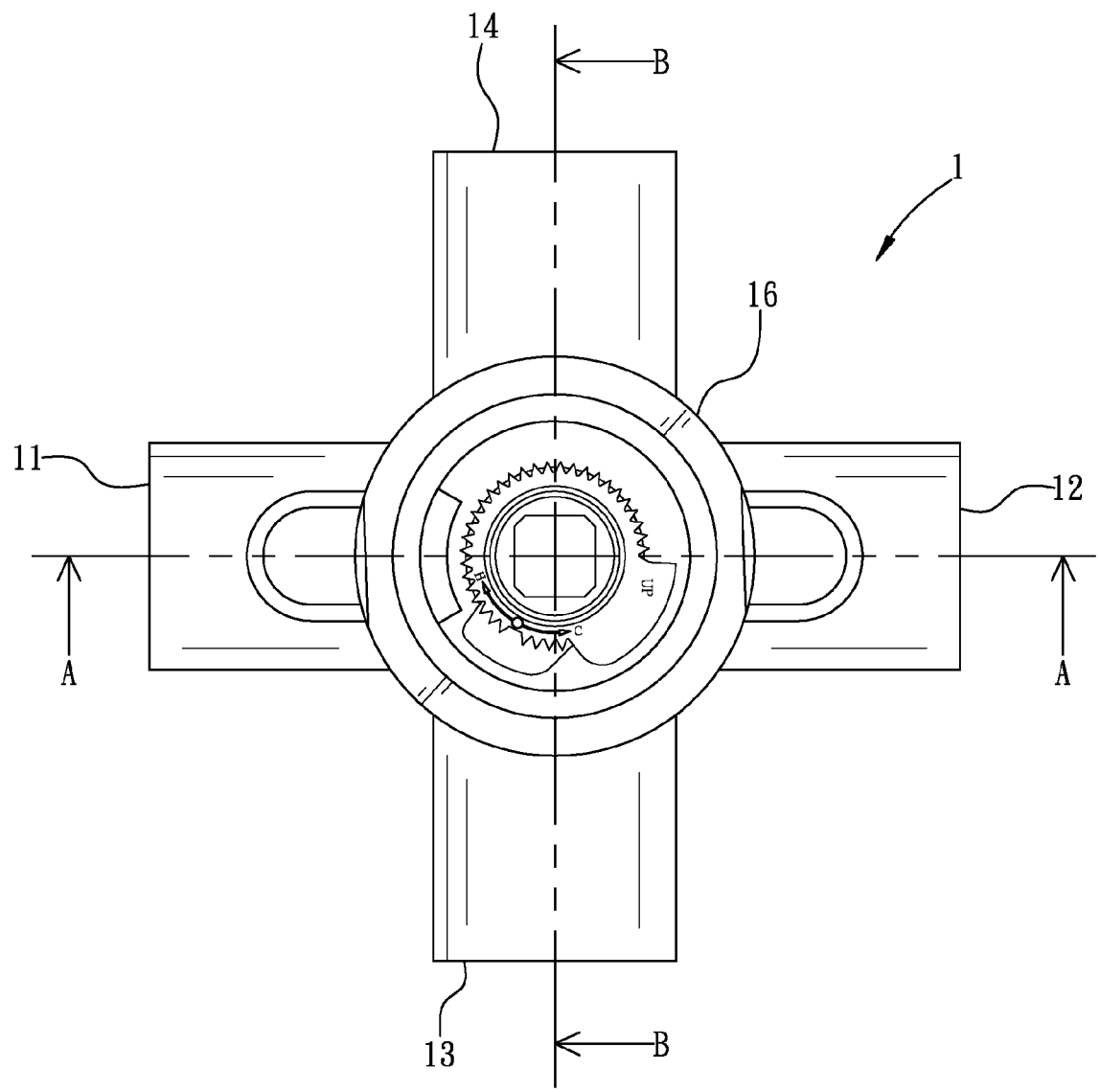
FIG. 2 illustrates a top view in accordance with this invention.
Figure 3:
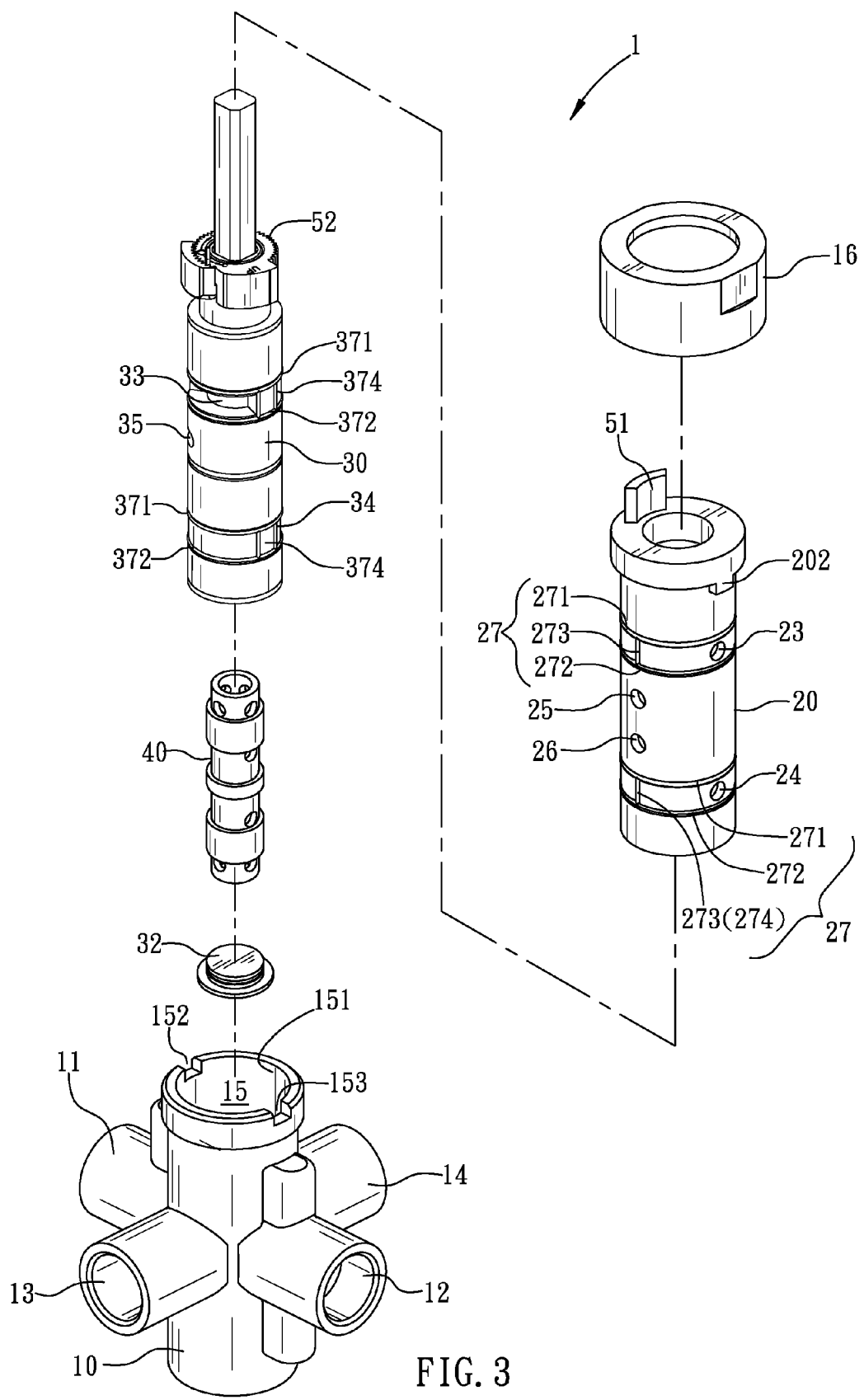
FIG. 3 illustrates an exploded view in accordance with this invention.
Figure 4:
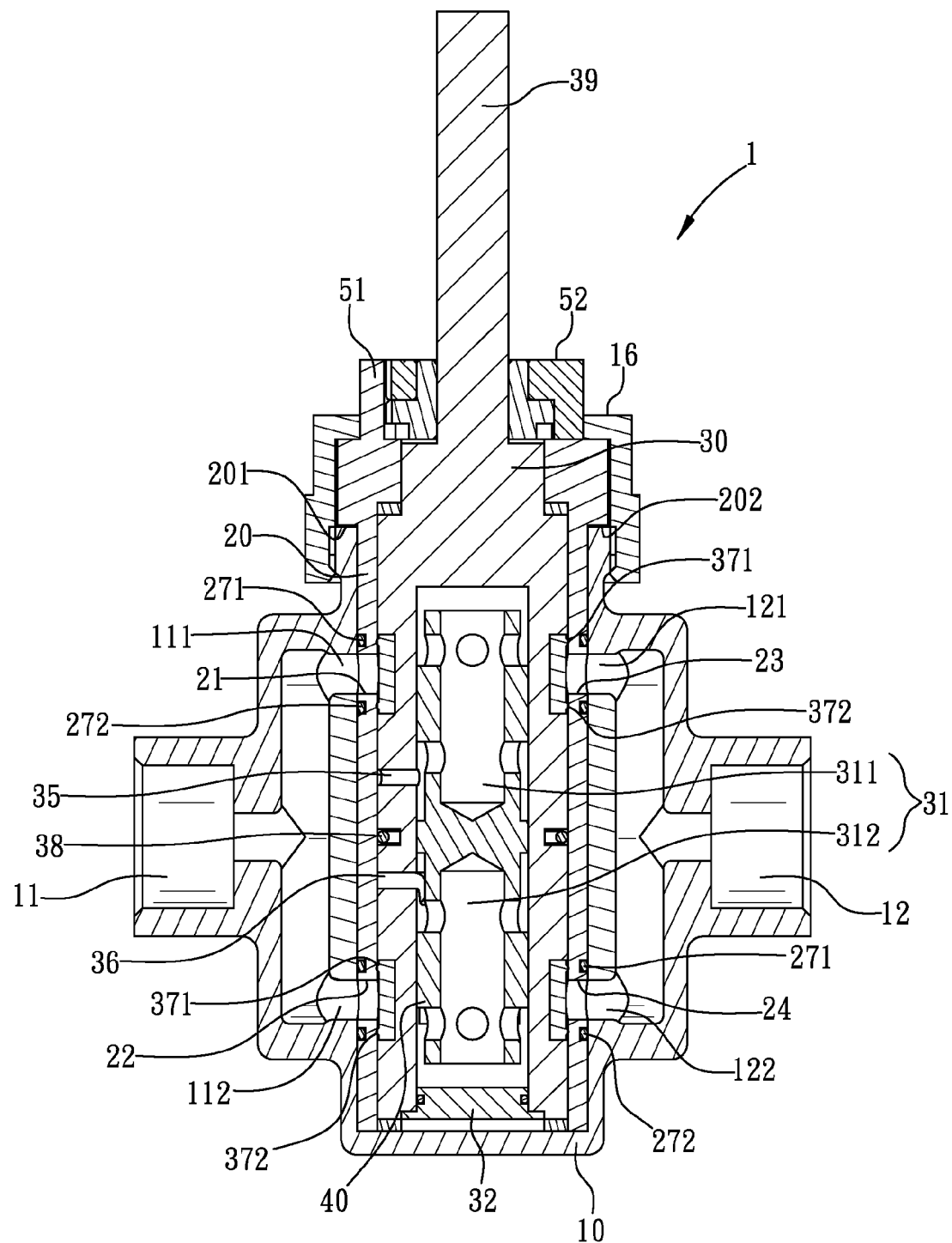
FIG. 4 illustrates a sectional view cut from line A-A in accordance with this invention.
Figure 5:
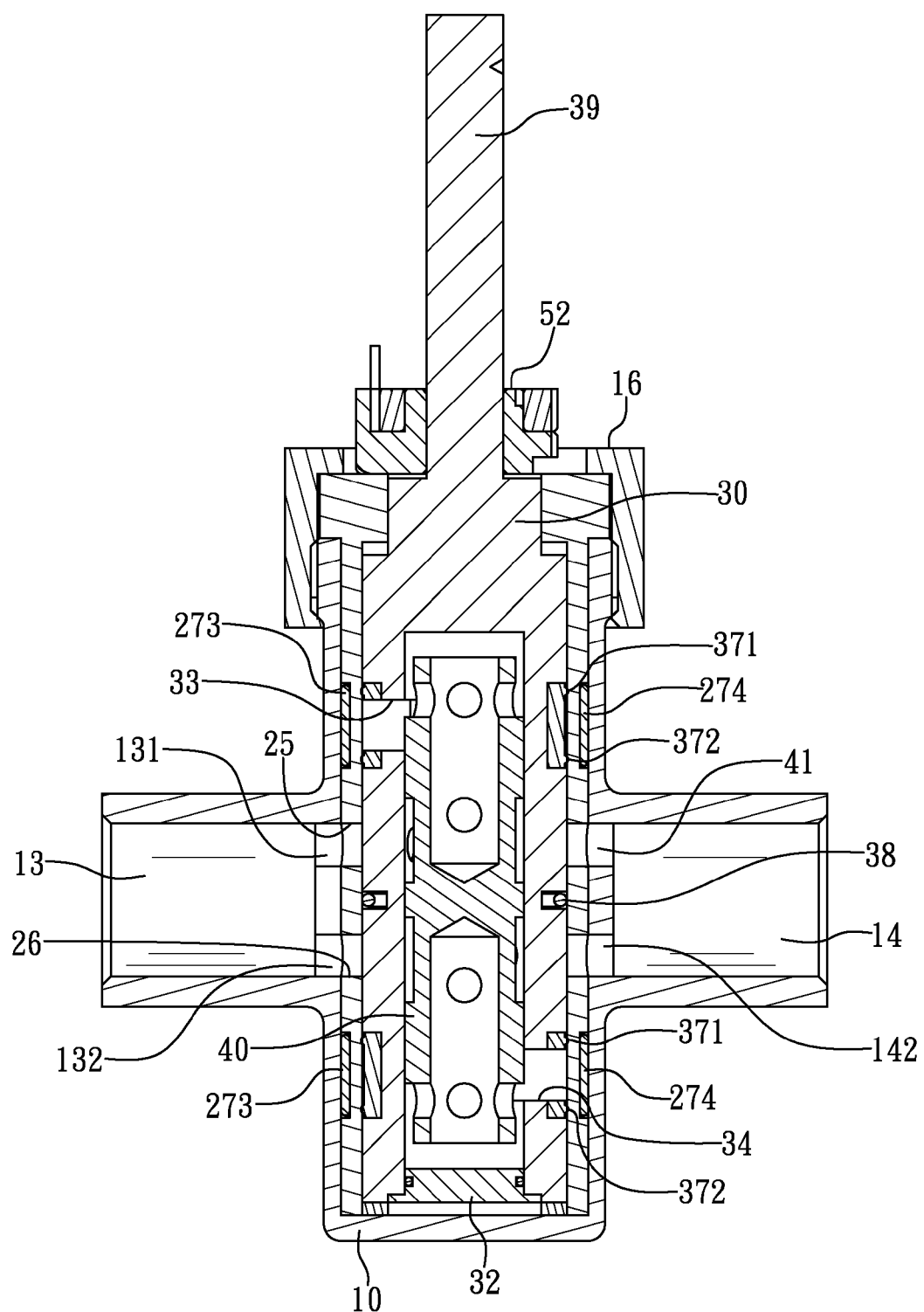
FIG. 5 illustrates a sectional view cut from line B-B in accordance with this invention.
Figure 6:
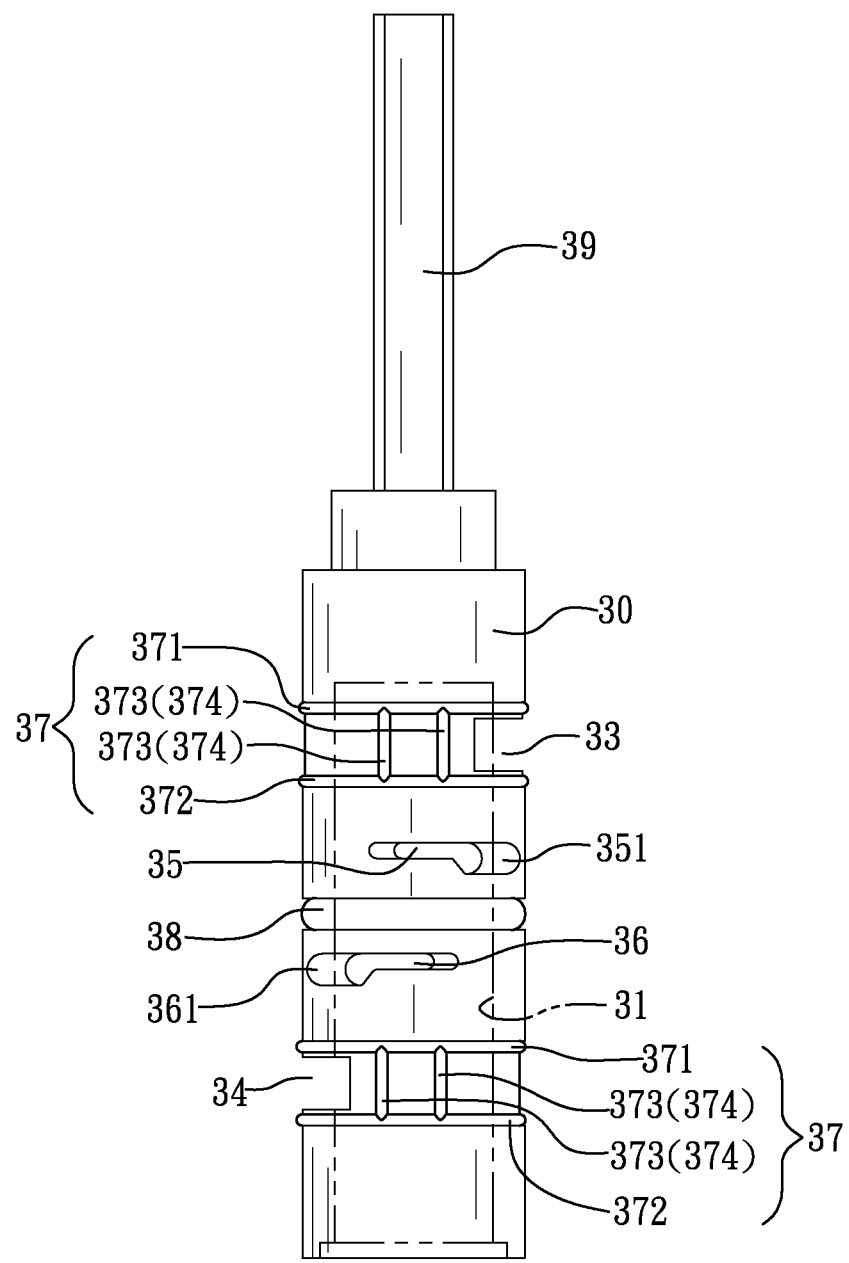
FIG. 6 illustrates a side view of a spindle in accordance with this invention.

Please refer to FIGS. 1 to 6, wherein FIG. 1 illustrates a pictorial drawing in accordance with this invention, FIG. 2 illustrates a top view in accordance with this invention, FIG. 3 illustrates an exploded view in accordance with this invention, FIG. 4 illustrates a sectional view cut from line A-A in accordance with this invention, FIG. 5 illustrates a sectional view cut from line B-B in accordance with this invention, and FIG. 6 illustrates a side view of a spindle in accordance with this invention.

The mixed water control valve 1 comprises a body 10, a bushing 20, a spindle 30, and a balance valve 40.

The body 10 is having a first inlet pipe 11, a second inlet pipe 12 opposite to the first inlet pipe 11, a first outlet pipe 13, and a second outlet pipe 14 opposite to the first outlet pipe 13. And the body 10 is also having a space 15 which is cylindrical. An opening 151 is disposed at one end of the space 15 to make the bushing 20, the spindle 30 and the balance valve 40 to be assembled from the opening 151 into the space 15, and the other end of the space 15 opposite to the opening 151 is closed. The body 10 is further having a cover 16 which is corresponding to the opening 151 to stop the bushing 20 and the spindle 30 to be assembled in the space 15.

The first inlet pipe 11 is branched to a first upper inlet pipe 111 and a first lower inlet pipe 112, and one end of the first upper inlet pipe 111 away from the first inlet pipe 11 and one end of the first lower inlet pipe 112 away from the first inlet pipe 11 are connected to the space 15. The second inlet pipe 12 is branched to a second upper inlet pipe 121 and a second lower inlet pipe 122, and one end of the second upper inlet pipe 121 away from the second inlet pipe 12 and one end of the second lower inlet pipe 122 away from the second inlet pipe 12 are connected to the space 15. The first upper inlet pip 111 and the second upper inlet pipe 121 are positioned at the same height, and the first lower inlet pipe 112 and the second lower inlet pipe 122 are positioned at the same height.

The first outlet pipe 13 and the second outlet pipe 14 are connected to the space 15. In this embodiment, the first outlet pipe 13 is having a first upper outlet 131 and a first lower outlet 132 longitudinally separately arranged to connect to the space 15, and the second outlet pipe 14 is having a second upper outlet 141 and a second lower outlet 142 longitudinally separately arranged to connect to the space 15.

The first outlet pipe 13 and the second outlet pipe 14 are positioned at the same height, and the height positions of the first outlet pipe 13 and the second outlet pipe 14 are located between the height positions of the first upper inlet pipe 111 and the first lower inlet pipe 112.

The bushing 20 is disposed in the space 15 to separate the body 10 and the spindle 30. The bushing 20 is fastened to the body 10 and the spindle 30 is rotatably disposed in the bushing 20. Two recesses 152, 153 are radially opposite to each other and disposed at the body 10 adjacent to the opening 151 of the space 15, and the bushing 20 is having two protruding blocks 201, 202 respectively corresponding to the two recesses 152, 153 to make the two protruding blocks 201, 202 embed the corresponding recesses 152, 153 to position the bushing 20.

The bushing 20 is having a first hole 21, a second hole 22, a third hole 23, a fourth hole 24, a fifth hole 25, and a sixth hole 26 respectively corresponding to the first upper inlet pipe 111, the first lower inlet pipe 112, the second upper inlet pipe 121, the second lower inlet pipe 122 of the body 10, the upper inlet 131, and the lower inlet 132 of the body 10 to make water pass through. At least two first sealing members 27 are disposed between the bushing 20 and the body 10 to separate the first hole 21, the third hole 23, the fifth hole 25 and the sixth hole 26, the second hole 22, the fourth hole 24. In this embodiment, each first sealing member 27 are composed of two surrounding portion 271, 272 and two longitudinal portions 273, 274.

The spindle 30 is axially rotatably disposed in the bushing 20 which is disposed in the space 15. A cavity 31 is formed inside the spindle 30. The cavity 31 of the spindle 30 is run through the spindle 30 from one end of the spindle 30, and a stopper 32 is assembled at the end of the cavity 31 passed through the spindle 30 to provide the balance valve 40 to assemble in the cavity 31. And the balance valve 40 is disposed in the cavity 31 to divide the cavity 31 into an upper cavity 311 and a lower cavity 312. The balance valve 40 is well-known and is omitted the detail descriptions.

The spindle 30 is having an upper inlet 33 corresponding to a height of the first inlet pipe 111, and the upper inlet 33 of the spindle 30 is extending an angle (90~120 degree in this embodiment) along its periphery and then connecting to the upper cavity 311. The upper inlet 33 is selectively corresponding to the first upper inlet pipe 111 or the second upper inlet pipe 121. The spindle 30 is having a lower inlet 34 corresponding to a height of the first lower inlet pipe 112, and the lower inlet 34 of the spindle 30 is extending an angle (90~120 degree in this embodiment) along the periphery and then connecting to the lower cavity 312. The lower inlet 34 is selectively corresponding to the first lower inlet pipe 112 or the second lower inlet pipe 122. The upper inlet 33 and the lower inlet 34 are radially corresponding to each other.

Furthermore, the spindle 30 is having an upper outlet 35 and a lower outlet 36 which are respectively corresponding to the first upper outlet 131 and the first lower outlet 132 of the first outlet pipe 13, and the upper outlet 35 is connecting to the upper cavity 311 and the lower outlet 36 is connecting to the to lower cavity 312. The upper outlet 35 and the lower outlet 36 are selectively corresponding to the first upper outlet 131 and the first lower outlet 132 the first outlet pipe 13 or the second upper outlet 141 and the second lower outlet 142 of the second outlet pipe 14.

In this embodiment, the upper outlet 35 and the lower outlet 36 of the spindle 30 are separated up and down and staggered left and right, shown as FIG. 6. The upper outlet 35 is relatively close to the upper inlet 33 and the lower outlet 36 is relatively close to the lower inlet 34. And the upper outlet 35 and the lower outlet 36 are extending an angle (80~100 degree in this embodiment) along a periphery to make the upper outlet 35 and the lower outlet 36 simultaneously or respectively be corresponding to the first upper outlet 131 and the first lower outlet 132 of the first outlet pipe 13 or make the upper outlet 35 and the lower outlet 26 simultaneously or respectively be corresponding to the second upper outlet 141 and the second lower outlet 142 of the second outlet pipe 14. The upper outlet 35 is having a large opening section 351 adjacent to the upper inlet 33 and the lower outlet 36 is having a large opening section 361 adjacent to the lower inlet 34. And the large opening section 351 of the upper outlet 35 and the large opening section 261 of the lower outlet 26 are staggered to each other.

A plurality of sealing members are covered at an outer edge of the spindle 30 to separate the upper inlet 33, the upper outlet 35, the lower outlet 36, and the lower inlet 34. In this embodiment, the sealing members are including two second sealing members 37 and a sealing ring 38. Each second sealing member 37 is composed of two surrounding portions 371, 372 and at least two longitudinal portions 373, 374 connected two surrounding portions 371, 372 to make each second sealing members 37 and the sealing ring 38 be able to respectively separate the upper inlet 33, the lower inlet 34, the upper outlet 35, and the lower outlet 36.

A shaft portion 39 is extending from one end of the spindle 30, and the shaft portion 39 is extending to pass through the space 15 to operate the rotation of the spindle 30.

In addition, a part of the bushing 20 extending to the space 15 is protruding a fastening plate 51, and spindle 30 is formed a fastening assembly 52 corresponding to the fastening plate 51. The fastening plate 51 and the fastening assembly 52 are capable of restricting the angle of rotation of the spindle 30. The fastening plate 51 and the fastening assembly 52 are well-known and are omitted the detail descriptions.

In real, the body is made from metal material, and the spindle is also made from metal material. The bushing disposed between the body and the spindle is made of the plastic material or the bronze material. Hence, the body and the spindle are uneasily abraded by using materials with different hardness. Therefore, if impurities such as dust and rust deposit get into the mixed water control valve of this invention, the problems such as scratch and wear are given to the bushing due to the body and the spindle made from much harder material (metal) and the bushing made from much softer material (plastic). It is easy to disassemble and replace while damage and further easy to repair and use with convenience.

Figure 7:
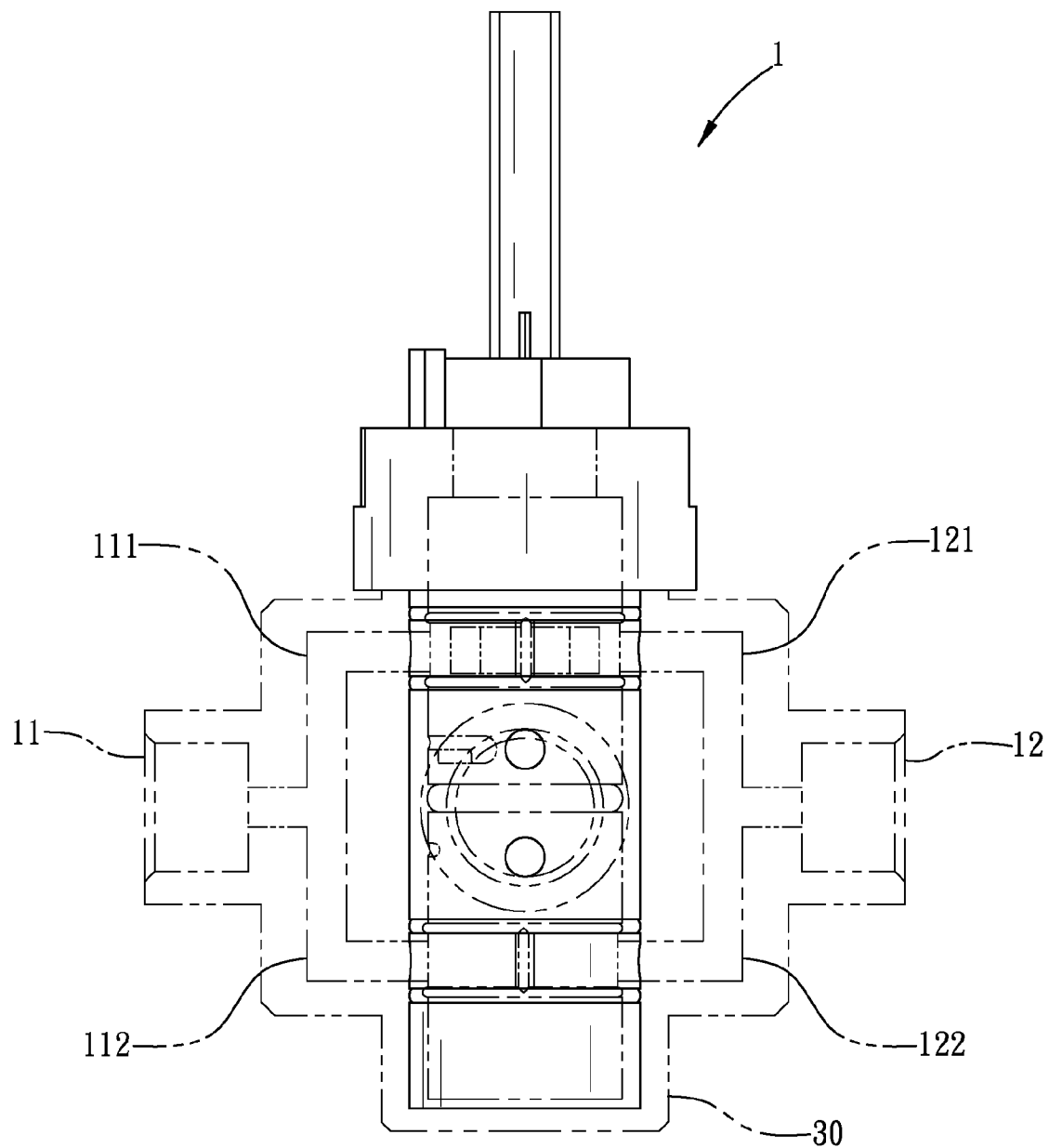
FIG. 7 illustrates a view of a operation state in accordance with this invention.
Figure 8:
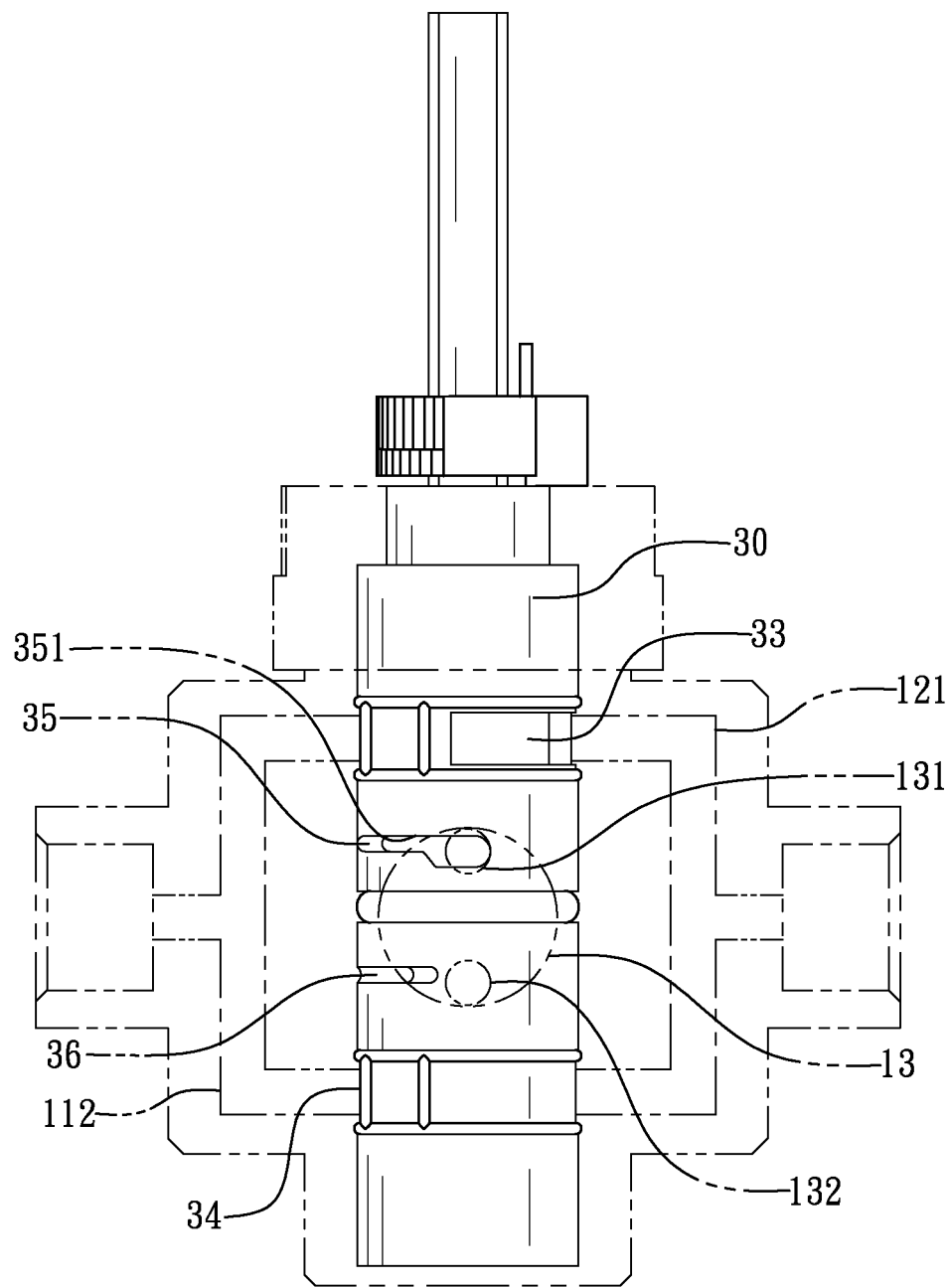
FIG. 8 illustrates a view of another operation state in accordance with this invention.
Figure 9:
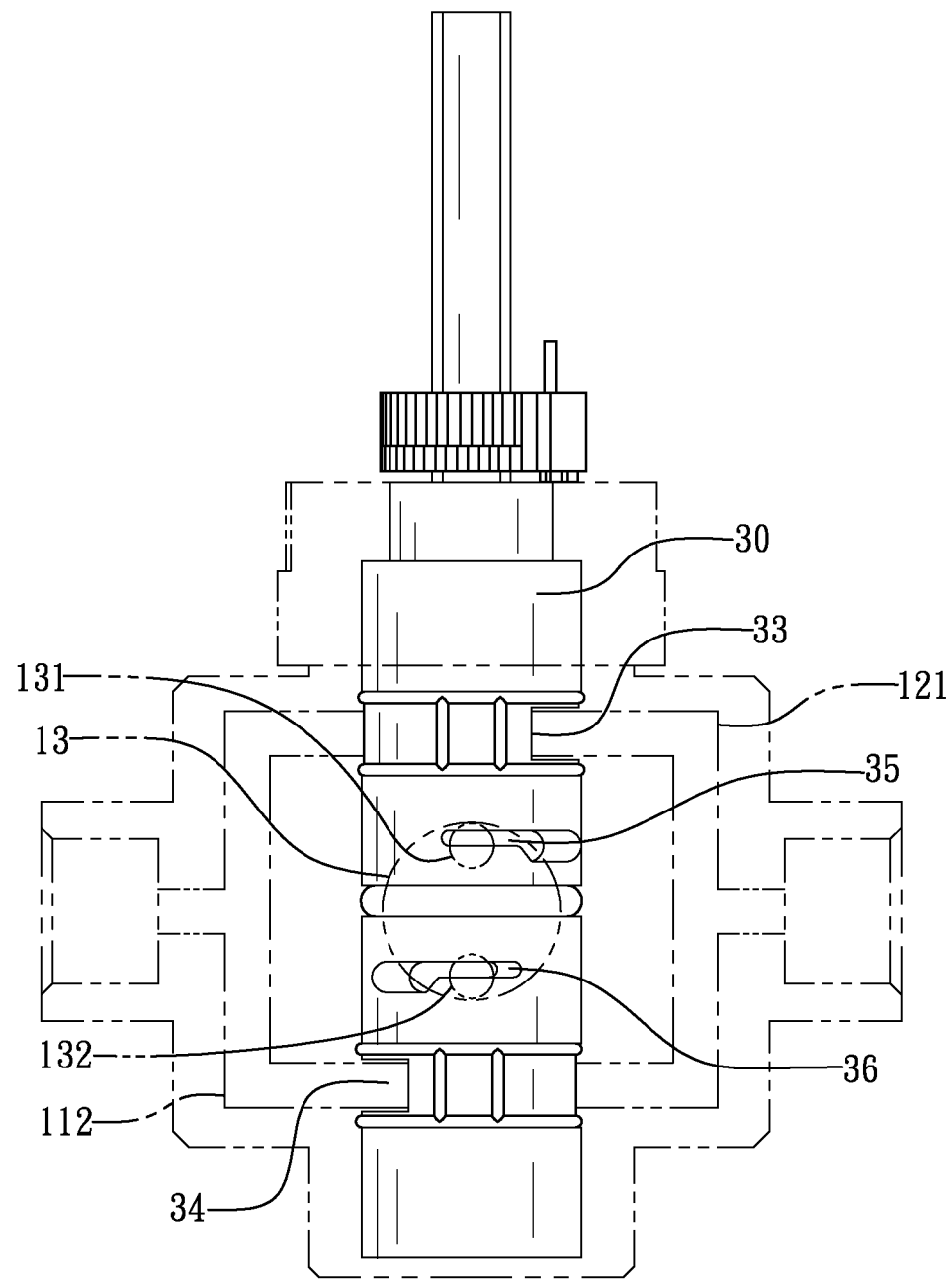
FIG. 9 illustrates a view of another operation state in accordance with this invention.
Figure 10:
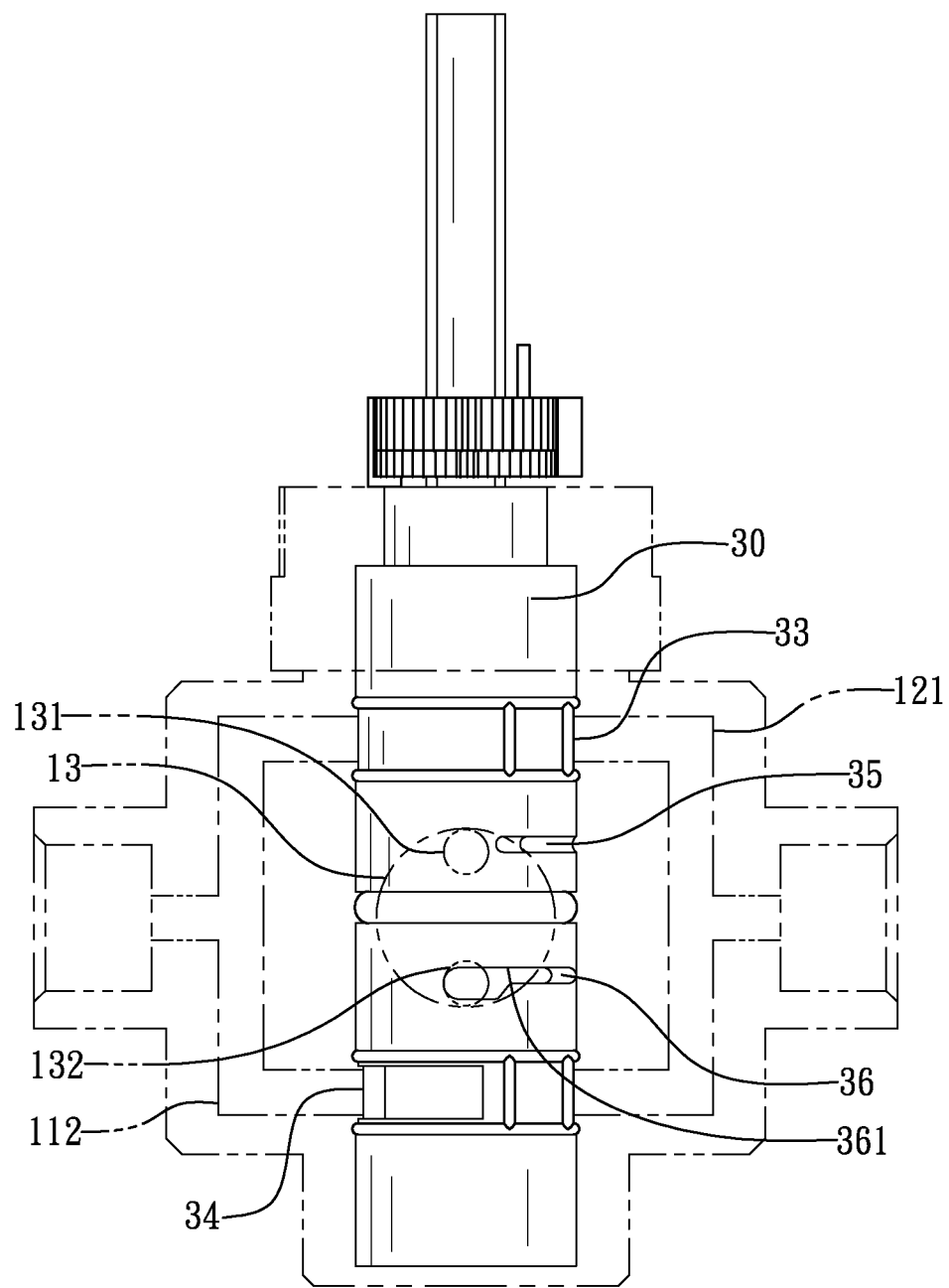
FIG. 10 illustrates a view of another operation state in accordance with this invention.

Please refer to FIGS. 7 to 10, wherein FIG. 7 illustrates a view of a operation state in accordance with this invention, FIG. 8 illustrates a view of another operation state in accordance with this invention, FIG. 9 illustrates a view of another operation state in accordance with this invention, and FIG. 10 illustrates a view of another operation state in accordance with this invention.

Firstly, please refer to FIG. 7. The mixed water control valve 1 in normal state is that the first inlet pipe 11 connects a hot water pipe (not shown) and the second inlet pipe 12 connects a cold water pipe (not shown). When the spindle 30 is not rotated, the upper inlet 33 is located at front central position in FIG. 7 and the lower inlet 34 (not shown in FIG. 7) is located at back central position in FIG. 7, i.e. the upper inlet 33 and the lower inlet 34 are not corresponding to any one of the first upper inlet pipe 111, the first lower inlet pipe 112, the second upper inlet pipe 121, or the second lower inlet pipe 122 to make the mixed water control valve 1 is in close state.

Please refer to FIG. 8. When the spindle 30 is turned right an angle, a part of the upper inlet 33 of the spindle 30 is coupled to the second upper inlet pipe 121 and the large opening section 351 of the upper outlet 35 is coupled to the first upper outlet 131 to make cold water flow from the second upper inlet pipe 121 via the upper inlet 33 to the upper capacity 311, and then flow from the upper outlet 35 via the first upper outlet 131 to the first outlet pipe 13 and flows out. Simultaneously, a part of the lower inlet 34 of the spindle 30 is coupled to the first lower inlet 112, but the lower outlet 36 is not coupled to the first lower outlet 132, so hot water only flows from the lower inlet 34 to lower capacity 312 but hot water does not flow to the first outlet pipe 13. Therefore, FIG. 8 shows the state of flowing out cold water.

Please refer to FIG. 9. When the spindle 30 is further turned right an angle compared to FIG. 8, the upper inlet 33 of the spindle 30 is coupled to the second upper inlet pipe 121 and the upper outlet 35 is coupled to the first upper outlet 131 to make cold water flow from the second upper inlet pipe 121 via the upper inlet 33 to the upper capacity 311 and then flow from the upper outlet 35 via the first outlet 131 to the first outlet pipe 13 and flow out. Simultaneously, the lower inlet 34 of the spindle 30 is coupled to the first lower inlet 112 and the lower outlet 36 is coupled to the first lower outlet 132 to make hot water flow from the first lower inlet pipe 112 via the lower inlet 34 to the lower capacity 312 and then flow from the lower outlet 36 via the first lower outlet 132 to the first outlet pipe 13 and flow out. Therefore, FIG. 9 shows the state of flowing out mixed water.

Please refer to FIG. 10. When the spindle 30 is further turned right an angle compared to FIG. 9, a part of the upper inlet 33 is still coupled to the second upper inlet pipe 121 but the upper outlet 35 has been staggered with the first upper outlet 131 and not coupled each other, so cold water does not flow out from the first upper outlet 131. Simultaneously, the lower inlet 34 of the spindle 30 is coupled to the first lower inlet pipe 112 and the large opening section 361 of the lower outlet 36 is coupled to the first lower outlet 132, so hot water flows from the lower inlet 34 to lower capacity 312, and then flows from the first lower outlet 132 to the first outlet pipe 13 and flows out. Therefore, FIG. 10 shows the state of flowing out hot water.

Figure 11:
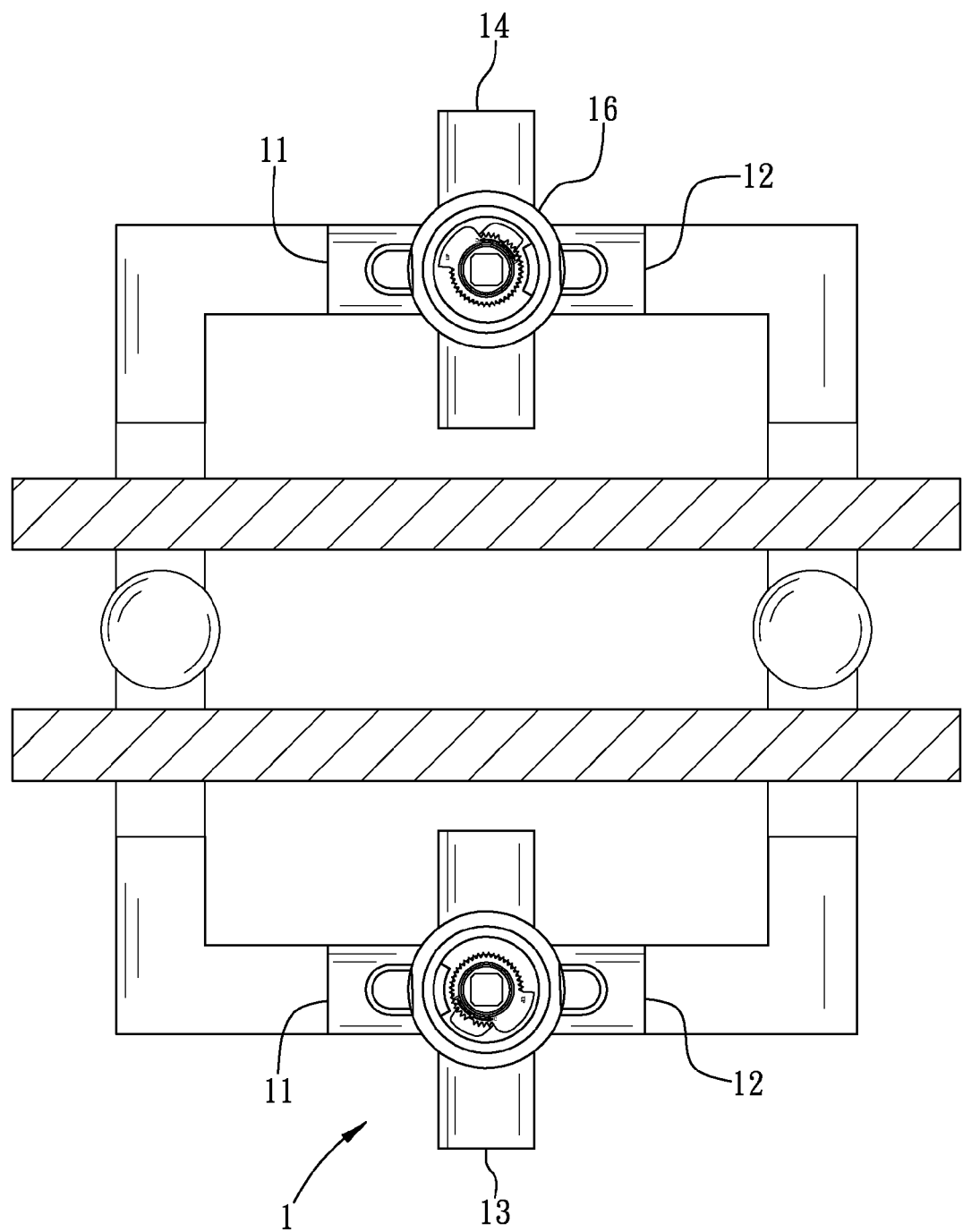
FIG. 11 shows an arrangement drawing while in operation in accordance with this invention.
Figure 12:
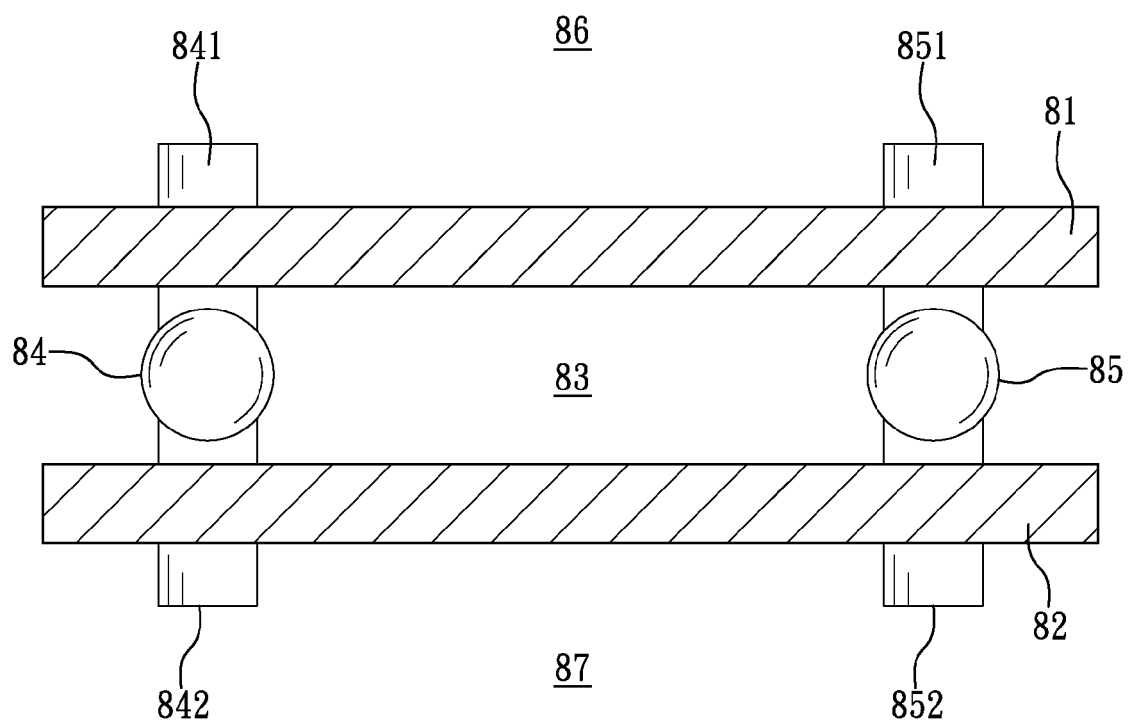
FIG. 12 shows a top and sectional view of a part of a building.

Finally, please refer to FIG. 11, which shows an arrangement drawing while in operation in accordance with this invention. When a cold water pipe (not shown) and a hot water pipe (not shown) is in a normal arrangement (lower position shown as FIG. 11), the mixed water control valve 1 is coupled to the hot water pipe by the first inlet pipe 11 and coupled to the cold water pipe by the second inlet pipe 12, and then water flows out from the first outlet pipe 13. When the cold water pipe (not shown) and the hot water pipe (not shown) is in an opposite arrangement (upper position shown as FIG. 11), the first inlet pipe 11 is coupled to the hot water pipe (not shown) and the second inlet pipe 12 is coupled to the cold water pipe (not shown), and then the bushing and the to spindle are turned 180 degree to be re-positioned by tools. Therefore, the upper inlet of the spindle is corresponding to the first upper inlet pipe, the lower inlet is corresponding to the second lower inlet pipe, and the upper outlet and the lower outlet are corresponding to the second outlet pipe to flow out from the second outlet pipe 14.

In summary, the mixed water control valve of this invention is capable of achieving to adapt different arrangements of cold water pipe and hot water pipe.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A mixed water control valve, comprising:
    a body, having a first inlet pipe, a second inlet pipe opposite to the first inlet pipe, a first outlet pipe, and a second outlet pipe opposite to the first outlet pipe, the body also having a space, the first inlet pipe is branched to a first upper inlet pipe and a first lower inlet pipe, one end of the first upper inlet pipe away from the first inlet pipe and one end of the first lower inlet pipe away from the first inlet pipe are connected to the space, the second inlet pipe is branched to a second upper inlet pipe and a second lower inlet pipe, one end of the second upper inlet pipe away from the second inlet pipe and one end of the second lower inlet pipe away from the second inlet pipe are connected to the space, the first outlet pipe and the second outlet pipe are connected to the space; and
    a spindle, axially rotatably disposed in the space, a cavity is formed inside the spindle and a balance valve is disposed in the cavity to divide the cavity into an upper cavity and a lower cavity, the spindle is having an upper inlet corresponding to a height of the first inlet pipe and connecting to the upper cavity, the upper inlet is selectively corresponding to the first upper inlet pipe or the second upper inlet pipe, the spindle is having a lower inlet corresponding to a height of the first lower inlet pipe and connecting to the lower cavity, the lower inlet is selectively corresponding to the first lower inlet pipe or the second lower inlet pipe, the upper inlet and the lower inlet are radially corresponding to each other, the spindle is having an upper outlet and a lower outlet which are respectively corresponding to a height of the first outlet pipe, the upper outlet is connecting to the upper cavity and the lower outlet is connecting to the lower cavity, the upper outlet and the lower outlet are selectively corresponding to the first outlet pipe or the second outlet pipe;
    wherein the lower inlet is corresponding to the first lower inlet pipe and the upper outlet and the lower outlet are corresponding to the first outlet pipe while the upper inlet is corresponding to the second upper inlet pipe; in contrast, the lower inlet is corresponding to the second lower inlet pipe and the upper outlet and the lower outlet are corresponding to the second outlet pipe while the upper inlet of the spindle is corresponding to the first upper inlet pipe.

2. The mixed water control valve as claimed in claim 1, wherein the first upper inlet pipe and the second upper inlet pipe are positioned at the same height, and the first lower inlet pipe and the second lower inlet pipe are positioned at the same height.

3. The mixed water control valve as claimed in claim 1, wherein the height positions of the first outlet pipe and the second outlet pipe are located between the height positions of the first upper inlet pipe and the first lower inlet pipe.

4. The mixed water control valve as claimed in claim 1, wherein the first outlet pipe is having a first upper outlet and a first lower outlet longitudinally separately arranged to connect to the space, the first upper outlet and the first lower outlet are respectively corresponding to the upper outlet and the lower outlet of the spindle, the second outlet pipe is having a second upper outlet and a second lower outlet longitudinally separately arranged to connect to the space, the second upper outlet and the second lower outlet are respectively corresponding to the upper outlet and the lower outlet of the spindle.

5. The mixed water control valve as claimed in claim 1, wherein a plurality of sealing members are covered at an outer edge of the spindle to separate the upper inlet, the upper outlet, the lower outlet, and the lower inlet.

6. The mixed water control valve as claimed in claim 1, wherein a shaft portion is extending from one end of the spindle, and the shaft portion is extending to pass through the space to operate the rotation of the spindle.

7. The mixed water control valve as claimed in claim 1, wherein the cavity of the spindle is run through the spindle from one end of the spindle, and a stopper is assembled at the end of the cavity passed through the spindle to provide the balance valve to assemble in the cavity.

8. The mixed water control valve as claimed in claim 1, wherein the space is cylindrical and an opening is disposed at one end of the space to provide the spindle to be assembled, and the other end of the space opposite to the opening is closed.

9. The mixed water control valve as claimed in claim 8, wherein the body is having a cover corresponding to the opening to stop the spindle assembled in the space.

10. The mixed water control valve as claimed in claim 1, wherein the first outlet pipe and the second outlet pipe are positioned at the same height.

11. The mixed water control valve as claimed in claim 10, wherein the height positions of the first outlet pipe and the second outlet pipe are located between the height positions of the first upper inlet pipe and the first lower inlet pipe.

12. The mixed water control valve as claimed in claim 1, wherein the upper inlet and lower inlet of the spindle are radially corresponding to each other, and the upper inlet and the lower inlet are extending an angle along a periphery.

13. The mixed water control valve as claimed in claim 12, wherein the upper inlet and lower inlet of the spindle are radially corresponding to each other, and the upper inlet and the lower inlet are extending 90~120 degree along the periphery.

14. The mixed water control valve as claimed in claim 1, wherein the upper outlet and the lower outlet of the spindle are separated up and down and staggered left and right, the upper outlet is relatively close to the upper inlet, the lower outlet is relatively close to the lower inlet, and the upper outlet and the lower outlet are extending an angle along a periphery to make the upper outlet and the lower outlet simultaneously or respectively be corresponding to the first outlet pipe or make the upper outlet and the lower outlet simultaneously or respectively be corresponding to the second outlet pipe.

15. The mixed water control valve as claimed in claim 14, wherein the upper outlet is having a large opening section adjacent to the upper inlet, the lower outlet is having a large opening section adjacent to the lower inlet, and the large opening section of the upper outlet and the large opening section of the lower outlet are staggered to each other.

16. The mixed water control valve as claimed in claim 14, wherein the upper outlet and the lower outlet are extending 80~100 degree along the periphery.

17. The mixed water control valve as claimed in claim 1, wherein a bushing is disposed in the space to separate the body and the spindle, the bushing is fastened to the body, the spindle is rotatably disposed in the bushing, and the bushing is having a first hole, a second hole, a third hole, a fourth hole, a fifth hole, and a sixth hole respectively corresponding to the first upper inlet pipe, the first lower inlet pipe, the second upper inlet pipe, the second lower inlet pipe of the body, the upper inlet, and the lower inlet of the spindle to make water pass through.

18. The mixed water control valve as claimed in claim 17, wherein at least two first sealing members are disposed between the bushing and the body to separate the first hole, the third hole, the fifth hole and the sixth hole, the second hole, the fourth hole.

19. The mixed water control valve as claimed in claim 17, wherein the bushing is made of a plastic material or a bronze material.

20. The mixed water control valve as claimed in claim 17, wherein two recesses are radially opposite to each other and disposed at the body adjacent to the opening of the space, and the bushing is having two protruding blocks respectively corresponding to the two recesses to make the two protruding blocks embed the corresponding recesses to position the bushing.

\* \* \* \* \*